Sept. 27, 1960 L. W. SEIFRIED ET AL 2,953,988
PRINTING PLATES
Filed Sept. 15, 1955 2 Sheets-Sheet 1

INVENTORS.
LYLE W. SEIFRIED
DONALD L. ERICKSON
BY Wallace and Cannon
ATTORNEYS

Sept. 27, 1960 L. W. SEIFRIED ET AL 2,953,988
PRINTING PLATES
Filed Sept. 15, 1955 2 Sheets-Sheet 2
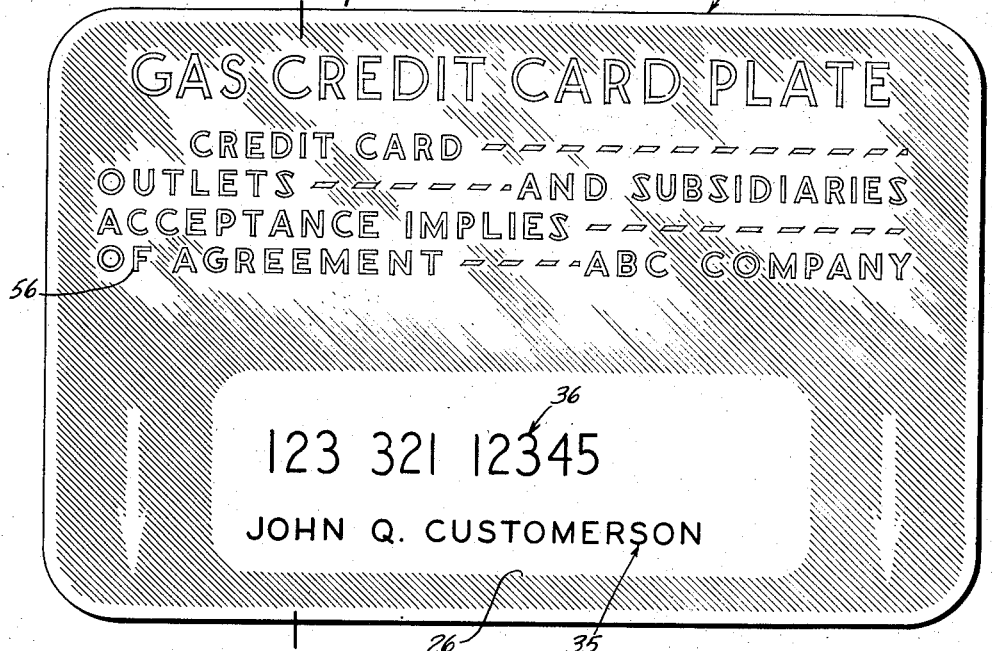
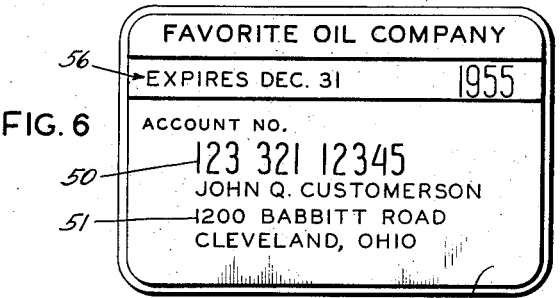
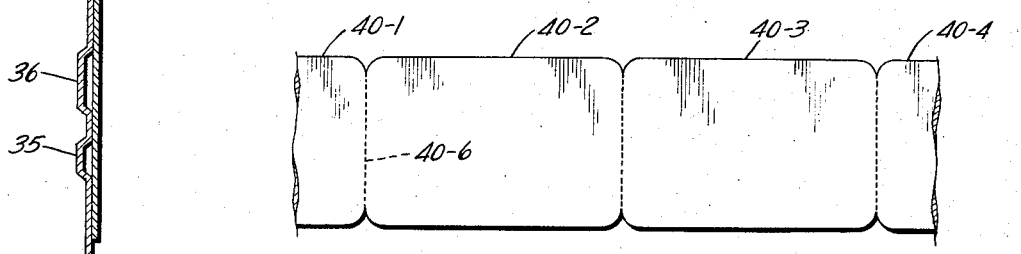
INVENTORS.
LYLE W. SEIFRIED
DONALD L. ERICKSON
BY Wallace and Cannon
ATTORNEYS

United States Patent Office 2,953,988
Patented Sept. 27, 1960

2,953,988
PRINTING PLATES

Lyle W. Seifried and Donald L. Erickson, Euclid, Ohio, assignors to Addressograph-Multigraph Corporation, Cleveland, Ohio, a corporation of Delaware Filed Sept. 15, 1955, Ser. No. 534,539

2 Claims. (Cl. 101—369)

This invention relates to printing devices of the kind that are used for credit transactions, and which are adapted to bear in one area data such as a name, address, and code number which identify the customer and which are utilized for imprinting sales slips or the like to insure accuracy in maintaining records pertaining to credit transactions of a customer to whom such a device has been issued.

In order to expedite and insure accuracy in credit transactions among selected or qualified individuals, merchandisers in various fields of business, particularly those having numerous dispersed or nation-wide outlets, have resorted to credit instruments comprising a printing plate that is embossed with data identifying the customer who has qualified for credit, and heretofore this plate has been removably mounted on a card of paper stock or like temporary material. The card is printed with the trade name and related data of the business enterprise which furnishes the credit instrument to the customer and usually also data pertaining to the terms, conditions, and like factors that have a material bearing on the credit status or relation on which agreement has been reached between the qualified customer and the particular business concern. For instance, most companies issue instruments that are valid for a term certain, and such is expressed on the card. When a credit transaction is made on the basis of such an instrument presented by the customer to a vendor such as at a gasoline service station, the person in charge of the sale uses the printing plate to imprint the sales slip in an alloted area with the identifying data so that there is an accurate customer record of the transaction.

Heretofore, the embossed plate has been mounted on the card, usually by fastening lugs or the like struck from the plate, so as to enable the plate and the card to be associated as a single instrument having separable parts. The card of course is subject to wear and mutilation, and hence the card and the attached plate are usually encased in a relatively heavy transparent cover. These three elements are held together in such a way as to expose the printing side of the plate so that the identifying data in the form of embossed type characters or the like that appear thereon are exposed for imprinting during the course of a credit transaction as aforesaid. The cover serves also to back up or reinforce the card, since the card is quite flexible and can be easily bent or dog-eared.

Devices of the foregoing kind have proven to be highly convenient instruments for credit transactions. The nature of the sale entailed is relatively simple, the sums of money required to be carried by the customer are reduced, and in many instances this is highly desirable, and the embossures on the plate which are of a permanent nature assure accurate and speedy invoicing of the credit transactions of an accredited customer.

Many of the commercial establishments which have adopted business methods based on instruments of the foregoing kind are desirous that the time during which the instrument is valid be stated, and among other things, that privileges, the issuing office, geographical limitations where credit is valid, participating subsidiaries and so on also be expressed on the credit instrument as remindful to the customer. Because of these considerations and others mentioned above, the card has been deemed essential to a complete credit instrument, and this has entailed resort to a transparent cover as aforesaid. An individual utilizing such an instrument usually does so with respect to several different businesses that have adopted this method of credit merchandising. Thus, one individual may be desirous of carrying on his person as many of the aforesaid instruments as have been issued to him, and since these are usually carried in the wallet or a folder of similar nature an inconvenience is encountered due to the combined thicknesses of the several instruments. This has caused considerable hesitancy in some instances among customers reluctantly faced with necessity of choosing but a selected few of the instruments to be carried.

Moreover, it is often times necessary that the several elements comprising the credit instrument as aforesaid be disassembled, as for instance when a customer to whom a credit instrument of the foregoing kind receiving a newly issued instrument has to place his signature on the card at the place indicated.

It will be seen from the foregoing that the accumulation in the hands of one customer of different credit instruments as heretofore constructed involve disadvantages where the customer is desirous of carrying each instrument issued to him or finds it necessary to perform what manipulations are involved when it is required to withdraw or expose the card relative to the protective cover.

There have been instances of credit instruments that do not include a transparent cover. These are usually restricted to transactions that will be purely local in nature, as in the instance of a department store or a group of local stores, catering to individuals of local residence whose credit rating is more or less readily verifiable, continuing for an indefinite period. A signature is usually required on instruments of this kind, and a space therefore is provided along an edge of a card that is retained by lugs on the side of the printing plate that is opposite the embossures. The embossures are formed on a raised panel, and this coupled with the aforementioned lugs, produces an instrument of objectionable thickness.

Under the present invention, there is afforded a credit instrument comprising a thin flat printing plate having an area in which data in the form of printing embossures pertaining to customer identification may be formed, and surrounding this area is a contrasting area delineated with data pertaining to the company that has extended credit, terms, outlets where the instrument is valid, participating subsidiaries and kindred data that are pertinent to the credit relations involved. Such is afforded by a plate having a surface provided in part with a coating of coloring material, and the plate is laid bare, that is, is devoid of such coloring material in an area that is to be embossed so that among other things the embossures will have bare or uncoated printing faces. Furthermore, when the embossed data identifying the credit customer are to be formed at the aforesaid exposed or bare area, this may be accomplished with accuracy and uniformity since this area can be used as a gauge for readily centering the plate in the embossing machine, thereby assuring that the adjacent area which is to contain credit relation data is free of embossures.

While the present invention is manifest primarily in a credit instrument consisting of a single plate, there are instances where it is desirable to associate with the plate a temporary or transitory card, as for example, when the credit instrument is to include the signature of the individual who has qualified for credit. As was mentioned, this has heretofore been accomplished under circumstances that require the use of a transparent cover that adds bulk to the credit instrument and a further object of the present invention is to enable such cover to be dispensed with, this being accomplished by securing the card to the back of the metal plate by a pressure sensitive adhesive and by the application of a thin transparent sheet or coating to the exposed face of the card that is protective in nature. In this way, the card is backed up so as not to be damaged through constant use, and the transparent sheet or coating assures that the data appearing on the card will remain substantially impervious to effacing conditions.

A further object of the present invention is to materially facilitate provision for a signature to be applied to the aforementioned card that is secured to the back of the plate. This is accomplished in such a way as to enable a signature to be placed on the instrument without removal of a protective cover or the like and without detaching the card relative to the plate to which it is secured.

A further object of the present invention is to materially reduce the thickness of credit instruments that are to include a printing plate and information or data relative to the credit standing or status, so that plurality of such instruments when stacked will occupy a volume substantially less than the same number of credit instruments as heretofore constructed.

Other and further objects of the present invention will be apparent from the following description and claims and are allustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

Fig. 4 is a diagramatic view illustrating one way in which the card portion of the instrument may be printed with the desired data;

Fig. 5 is a plan view of the printing side of a modified form of credit instrument;

Fig. 6 is a plan view of the reverse side of the instrument shown in Fig. 5; and Fig. 7 is a sectional view taken on the line 7—7 of Fig. 5.

One form of the present invention is illustrated in Figs. 1, 2, 2A, 3 and 3A as embodied in a credit instrument 20 comprising a thin, flat metallic plate 21 that may be of aluminum, alloy steel, suitable plastics or the like, having surface characteristics which will be described in somewhat more detail below. The plate 21 is of a size to conveniently fit into a compartment in a wallet, a shirt pocket, or other convenient location on the person.

As was mentioned above, it is desirable that data pertaining to the company issuing the instrument, and in certain instances some of the terms and attributes of the credit relation be stated on the printing face or side of the instrument. Under the present invention, the background area 25 of the plate 21 is adapted to bear such data and is characterized by a distinct color in contrast to a panel area 26 of the plate which will be described in more detail below.

Figure 1:
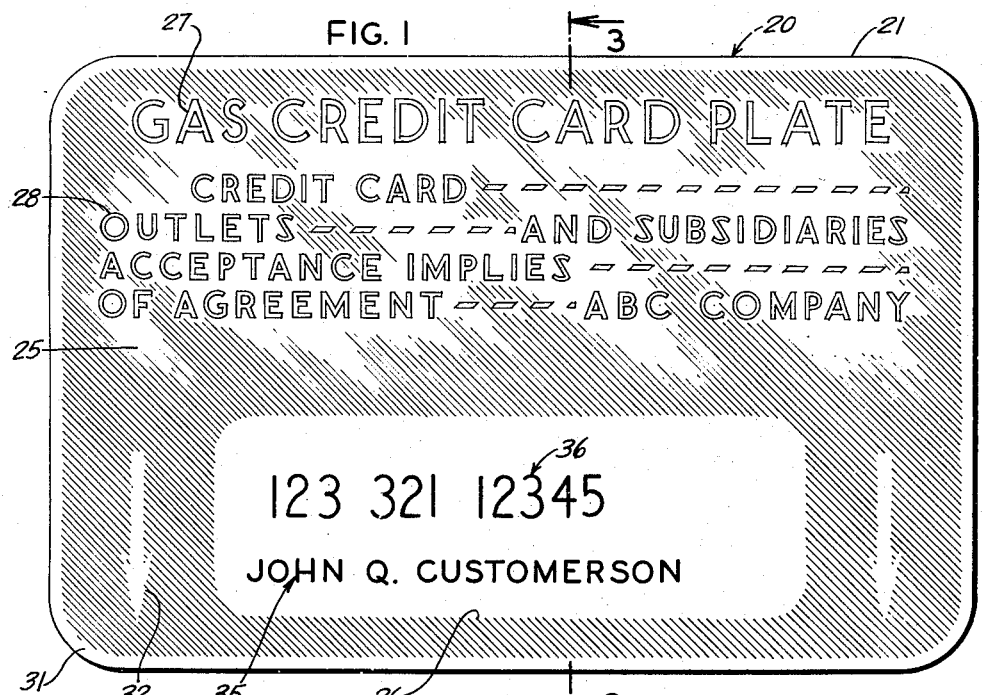
Fig. 1 is a plan view of the printing side of a credit instrument constructed in accordance with the present invention.

To enable the plate thus to be characterized in the background area 25, and to delineate the aforementioned data such as the designation 27 of the kind of instrument and expressly stated terms and provisions as 28 pertaining to outlets available, participating subsidiaries, the trade name of the issuing company and so on, the surface of the plate 21 at least on the side provided with the panel 26 is selected of the kind receptive to coloring material in the background area 25. In the instance of aluminum plates or plates of equivalent metal, the plate 21 may be anodized selectively through a resist so as to leave bare or unanodized portions of the plate delineating the data as aforesaid, and also the panel 26. Then, the plate may be dyed or colored in the anodized areas by known methods, thereby distinctly developing the data as 27 and 28 and the panel 26 as shown in Fig. 1, and other unanodized portions of the plate such as a border 31, and indicia as 32 serving as a guide for properly positioning the plate as will be described.

Methods other than anodization are of course suitable. Thus, the plate may be selectively etched through a resist so that the portions of the plate that are to be of a distinct color are recessed to retain pigment material which may be in the form of enamel of the desired color subsequently coated with lacquer. The enamel and lacquer are then removed by known methods from the unetched portions of the plate, thereby exposing the natural surface of the plate to develop the data as 27 and 28 and the other bare or natural surface portions mentioned above. The advantage of this procedure is that the etched portions bearing the pigment material will be recessed relative to the data as 27 and 28 and the panel 26, so that the pigment coating or deposit in this instance is protected by the raised areas of the plate.

Another procedure that has been found satisfactory is to lithograph the plate, and as is well known metals such as aluminum and zinc and certain alloys and synthetics are adapted to be provided with surfaces which in particular are receptive to lithographic inks. Hence, plates receptive to lithographic ink may be printed with the ink only in the background areas, that is, the area 25 that surrounds the panel 26 and the data as 27 and 28. Coloration imparted by this method, however, is not as adherent to the plate as by the foregoing methods, and a protective lacquer overcoat is preferably applied.

The foregoing procedures are exemplary. For instance, the porous nature of the anodized film on an aluminum plate enables light sensitive coatings to be deposited and developed thereon, and this obviously represents still another way of attaining contrast between the background area 25 and the portions of the plate 21 that are to remain bare to define the panel 26 and the various characters that comprise the data 27 and 28.

Under the present invention, the panel 26 that is bare or uncoated so as to expose the natural surface of the plate 21 is embossed with the name 35 of the customer and the particular code or like data 36 which is utilized for expediting entries of the credit transactions pertaining to the customer to whom the instrument 20 has been issued.

The embossures 35 and 36 will of course be struck up from the plate 21 within the panel 26 so as to afford corresponding relief type faces, and these are the data that will imprint the sales slip or invoice at the place where the credit transaction is performed. The data 35 and 36 in the present instance are direct reading, but it will be appreciated that whether the data 35 and 36 are direct or reverse reading will depend upon the way in which the credit instrument 20 is to be related to the sales slip or the invoice in the printing machine where the instrument 20 is used at the time of the credit transaction.

Several distinct advantages accrue from the panel 26 that is bare with respect to the background area 25. In the first place, this assures that during embossing of the panel 26 the punches and dies of the embossing machine are not fouled by the coloring material that has been applied to the background area 25 only. Moreover, the panel 26 serves as an aid or gauge for proper positioning of the plate 21 in the embossing machine, and enables the produced embossures to be readily proofed and inspected.

Figure 2:
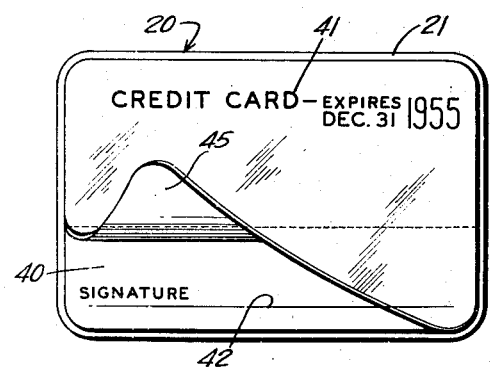
Fig. 2 is a plan view of the rear side of the instrument shown in Fig. 1 and illustrating the way in which the instrument in this instance is adapted for the placement of a signature.
Figures 3, 3A:
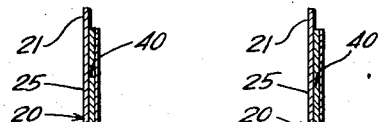
Figs. 3 and 3A are sectional views substantially at the line 3—3 of Fig. 1 illustrating the way in which the protective panel for the signature is to be handled.
Figure 2A:
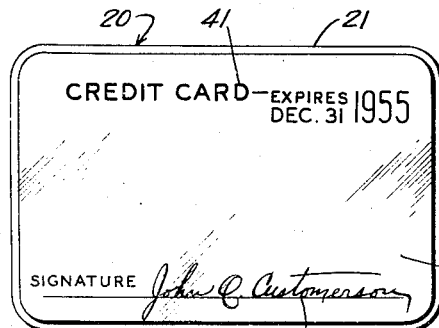
Fig. 2A shows the instrument of Fig. 2 bearing a signature that is protected.

In accordance with one form of the present invention, the plate 21 on the side or face thereof opposite that bearing the embossures 35 and 36 is provided with a card 40, Fig. 2, which in area is somewhat smaller than the plate 21. This card is of heavy paper stock of the usual kind and on the side that is in juxtaposition with respect to the back of the plate 21 is provided with a pressure sensitive adhesive so that the plate and card may be securely associated. The card 40 is imprinted with further data 41 pertaining to the credit relation, and it will be observed that this additional data is in the form of a term certain for which the instrument is valid. Moreover, where a card as 40 is provided, this is usually done with the placement of a signature thereon in mind. Thus the card 40 is provided with a signature line 42 for the placement of the customer's signature. As was mentioned above, such in the past has entailed considerable difficulty because of the way in which the plate has been associated with the card and the transparent protective cover. Under the present invention, the placement of the signature on the line 42 is facilitated by the provision of a thin film-like protective sheet 45 of transparent plastic of any preferred type having a loose or unattached flap 45A as the instrument 20 is issued to the customer. In the portion that is not extensive with the flap 45A, the sheet 45 is secured to the card 40 by pressure sensitive adhesive and this adhesive on the underside of the flap 45A is masked by a protective backing sheet 46. Therefore, the customer receiving the instrument 20 that has been issued to him first executes the instrument by adding his signature 42S, Fig. 2A at the place 42 provided. Then, he peels off the sheet 46 to expose the adhesive thereon and presses the flap 45A down on the card 40, preserving the data 41 and moisture-proofing the signature 42S.

A modified form of the invention is illustrated in Figs. 5, 6, and 7. The credit instrument 20A in this instance is identical to that described above except as to the card that is attached to the back of the plate. Thus, the card 40A in this instance is not of the kind that requires a signature. Instead of this, the card is imprinted at 50 with the embossed data that appear on the panel 26, and in addition is imprinted at 51 with the customer's address. The card is preferably coated with a transparent lacquer so as to protect the data appearing thereon. The data 50 and 51 may be conveniently printed in a printing machine utilizing printing devices of a well known kind each bearing the required printing embossures to produce the data 50 and 51. It will be further observed that the card 40A is imprinted with the trade name of the business concern issuing the instrument 20A as well as data 56 regarding the term certain for which the instrument is valid.

It will not always be necessary that a card as 40 or 40A be provided. Thus, it is possible under certain circumstances that all of the information that is pertinent to the credit relation involved appear on the side of the instrument provided with the embossed data as 35 and 36. This of course is highly desirable inasmuch as then the thickness of the credit instrument will be merely that of the plate as 21 and the embossed data 35 and 36. As a consequence, a large number of such credit instruments may be conveniently carried in the pocket of a wallet or a like pocket without being of appreciable or objectionable bulk. In this same connection, it will be recognized that the card 40 or 40A, and the protective sheet as 45 will in neither instance be of very great thickness, and the drawings are of course exaggerated as to scale so as to clearly illustrate the several elements that are associated in one credit instrument. Thus, the protective sheet as 45 will be of minimal thickness, and the stock from which the card 40 or 40A is produced need be no thicker than that required to receive imprints of the data that are to appear thereon.

The cards as 40 and 40A may be printed in groups in a printing machine of the kind mentioned above. Thus, as shown in Fig. 4, a series of cards as 40—1, 40—2, 40—3 and 40—4 are connected one to the other along weakened lines as 40—6, and the cards in this series could be fed through a printing machine so as to arrive one by one at a printing station to be imprinted from a printing device.

It will be seen from the foregoing that in accordance with the present invention a credit instrument is produced having a clearly defined area for embossed data and a distinct background in which data pertaining to the credit relation are delineated. Such credit relation data in the present instance represent information developed by the coloring or coating process used, inasmuch as the characters comprising this information, as well as the embossable area, are defined by bare or uncolored portions of the plate receiving none of the coloring material.

Hence, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. An issuable instrument of the kind described that is adapted to be carried on the person and which is to be provided in one area with data defining terms of entitlement and the like and in another area with sales slip imprinting embossures identifying the person to whom the instrument has been issued comprising a thin, flat plate adapted to be embossed in said other area to provide said imprinting embossures, said plate having on one side a surface treated to receive and retain coloring material outlining with background color portions of said plate delineating said data and the area where said embossures are to be provided, a card secured to the other side of said plate by adhesive and adapted to bear additional data including the signature of the person to whom the instrument has been issued, and a thin transparent protective sheet secured to said card except in a loose flap portion overlying the portion of said card that is to receive a signature as aforesaid, said flap being provided with adhesive normally protected by a peelable protective sheet so that the card may be signed, said peelable sheet removed to expose the adhesive on the flap and said flap then adhered to the card to protect the portion thereof bearing the signature.

2. An issuable instrument of the kind described that is adapted to be carried on the person and which is to be provided in one area with descriptive data and in another area with sales slip imprinting embossures identifying the person to whom the instrument has been issued comprising a thin, flat plate adapted to be embossed in said other area to provide said imprinting embossures, a card secured to one side of said plate and adapted to bear other data including the signature of the person to whom the instrument has been issued, and a thin transparent protective sheet secured to said card except in a loose flap portion overlying the portion of said card that is to receive a signature as aforesaid, said flap being provided with adhesive normally protected by a removable protective sheet so that the card may be signed, said sheet removed to expose the adhesive on the flap and said flap then adhered to the card to protect the portion thereof bearing the signature.

References Cited in the file of this patent

UNITED STATES PATENTS

| | | |
|---|---|---|
| 859,053 | Duncan | July 2, 1907 |
| 1,538,403 | Krell | May 19, 1925 |
| 1,794,528 | Miller | Mar. 3, 1931 |
| 2,374,356 | Keuffel et al. | Apr. 24, 1945 |
| 2,520,077 | Wolowitz | Aug. 22, 1950 |
| 2,600,972 | Comegys et al. | June 17, 1952 |
| 2,652,059 | Wossel | Sept. 15, 1953 |
| 2,745,200 | Lavallee | May 15, 1956 |
| 2,769,265 | Page | Nov. 16, 1956 |
| 2,802,418 | Carver et al. | Aug. 13, 1957 |

FOREIGN PATENTS

| | | |
|---|---|---|
| 391,167 | Great Britain | Apr. 18, 1933 |
| 689,348 | Great Britain | Mar. 25, 1953 |
| 692,153 | Great Britain | May 27, 1953 |